(12) United States Patent
Koseoglu

(10) Patent No.: US 8,940,155 B2
(45) Date of Patent: Jan. 27, 2015

(54) EBULLATED-BED PROCESS FOR FEEDSTOCK CONTAINING DISSOLVED HYDROGEN

(75) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 146 days.

(21) Appl. No.: 13/556,343

(22) Filed: Jul. 24, 2012

(65) Prior Publication Data

US 2013/0026068 A1 Jan. 31, 2013

Related U.S. Application Data

(60) Provisional application No. 61/513,055, filed on Jul. 29, 2011.

(51) Int. Cl.
| | |
|---|---|
| C10G 47/02 | (2006.01) |
| C10G 49/12 | (2006.01) |
| C10G 47/30 | (2006.01) |
| C10G 47/26 | (2006.01) |
| C10G 45/22 | (2006.01) |
| C10G 45/20 | (2006.01) |

(52) U.S. Cl.
CPC .............. *C10G 45/20* (2013.01); *C10G 49/12* (2013.01); *C10G 47/30* (2013.01); *C10G 47/26* (2013.01); *C10G 45/22* (2013.01)
USPC .............. 208/85; 208/108; 208/113; 208/121

(58) Field of Classification Search
USPC .................... 208/85, 108, 113, 121
See application file for complete search history.

(56) References Cited

U.S. PATENT DOCUMENTS

| | | | | |
|---|---|---|---|---|
| 4,670,132 | A | * | 6/1987 | Arias et al. ................. 208/111.1 |
| 4,684,456 | A | * | 8/1987 | Van Driesen et al. ......... 208/143 |
| 6,270,654 | B1 | * | 8/2001 | Colyar et al. .................. 208/57 |
| 6,436,279 | B1 | * | 8/2002 | Colyar .......................... 208/108 |
| 2009/0000986 | A1 | * | 1/2009 | Hassan et al. ................ 208/108 |

* cited by examiner

*Primary Examiner* — Brian McCaig
(74) *Attorney, Agent, or Firm* — Abelman, Frayne & Schwab

(57) ABSTRACT

An improved system and method for processing feedstocks in an ebullated-bed hydroprocessing reactor is provided in which hydrogen gas is dissolved in the fresh and recycled liquid feedstock by mixing and/or diffusion of an excess of hydrogen, followed by flashing of the undissolved hydrogen upstream of the reactor inlet, introduction of the feed containing dissolved hydrogen into the ebullated-bed hydroprocessing reactor whereby the dissolved hydrogen eliminates or minimizes the prior art problems of gas hold-up and reduced operational efficiency of the recycle pump due to the presence of excess gas in the recycle stream when hydrogen gas was introduced as a separate phase into the reactor.

14 Claims, 8 Drawing Sheets

EBULLATED-BED PROCESS FOR FEEDSTOCK CONTAINING DISSOLVED HYDROGEN

RELATED APPLICATIONS

This application claims priority to provisional patent application U.S. Ser. No. 61/513,055 filed Jul. 29, 2011, the contents of which are incorporated herein by reference.

BACKGROUND OF THE INVENTION

1. Field of the Invention

This invention relates to hydrocracking or hydroprocessing systems and processes that employ ebullated-bed reactors.

2. Description of Related Art

Common objectives of hydrocracking or hydroprocessing operations are to remove impurities such as sulfur, nitrogen and/or metals, particularly in residue feedstocks, and cracking the heavy feed into lower molecular weight hydrocarbons having lower boiling points to obtain transportation fuels such as gasoline and diesel. The reactions that occur in hydrocracking/hydroprocessing operations include hydrodesulfurization (HDS), carbon residue reduction (CRR), nitrogen removal (HDN), and cracking.

In a refinery, it is desirable to minimize the down-time for replacement or regeneration of catalyst. Further, process economics generally require a versatile system capable of handling feed streams of varying contaminants levels such as sulfur, nitrogen, metals and/or organometallic compounds, such as those found in a vacuum gas oils, deasphalted oils and residues.

There are three common reactor types used in the refining industry: fixed, ebullated, and moving bed. The decision to utilize a particular type of reactor is based on a number of criteria including the characteristics of the feedstock, desired conversion percentage, flexibility, run length, and requisite product quality.

The ebullated-bed reactor was developed to overcome plugging problems commonly associated with fixed-bed reactors during processing of relatively heavy feedstocks and as the conversion requirements increases, e.g., for vacuum residue. In an ebullated-bed reactor, the catalyst is in an expanded bed, thereby countering plugging problems associated with fixed-bed reactors. The fluidized nature of the catalyst in an ebullated-bed reactor also allows for on-line catalyst replacement of a small portion of the bed. This results in a high net bed activity which does not vary with time.

Fixed-bed technologies have considerable problems in treating particularly heavy charges containing relatively high quantity of heteroatoms, metals and asphaltenes, as these contaminants cause the rapid deactivation of the catalyst and plugging of the reactor. Multiple fixed-bed reactors connected in series can be used to achieve a relatively high conversion of heavy feedstocks boiling above 370° C., but such designs require high capital investment and, for certain feedstocks, commercially impractical, e.g. catalysts replacement every 3-4 months.

Therefore, to treat these heavy charges, ebullated-bed reactors were developed and are in operation worldwide. These reactors have numerous advantages in performance and efficiency, particularly with heavy crudes. Early ebullated-bed processes and systems are described by Johanson in U.S. Pat. Nos. 2,987,465 and 3,197,288, both of which are incorporated herein by reference.

In general, an ebullated-bed reactor includes concurrently flowing streams of liquids, solids and gas through a vertically-oriented cylindrical vessel containing catalyst. The catalyst is placed in motion in the liquid and has a gross volume dispersed through the liquid medium that is greater than the volume of the catalyst mass when stationary. Ebullated-bed reactors are incorporated in various refinery operations, including processes for the upgrading of heavy liquid hydrocarbons and the conversion of coal to synthetic oils.

Typically, a liquid hydrocarbon phase and a gaseous hydrogen phase are passed upwardly through the bed of catalyst particles at a rate such that the particles are forced into motion as the fluids pass upwardly through the bed. The catalyst bed expansion level is, at least in part, determined by the bottoms recycle liquid flow rate, which is controlled by an ebullating-bed pump. During steady-state operation (i.e., the ebullated-bed state), the bulk of the catalyst does not rise above a certain level in the reactor which is predetermined during reactor design. This level is established to prevent the catalyst particles from leaving the reactor or to interfere with the efficient operation of the cyclones that are installed inside the reactors to separate carried-over catalyst particles from the gas-liquid mixture. More catalyst can be loaded into the reactor initially because of no gas hold-up and liquid viscosity. These design criteria are well within the routine skill in the art. A substantial portion of the product vapors and liquids pass through the upper level of the catalyst particles into a substantially catalyst-free zone and are removed proximate to the upper portion of the reactor.

Substantial amounts of hydrogen gas and light hydrocarbon vapors rise through the reaction zone into the catalyst-free zone. Liquid is recycled to the bottom of the reactor and removed from the reactor as net product from this catalyst-free zone. A certain portion of the vapor is separated from the liquid recycle stream before being passed through the recycle conduit drawn by suction of ebullating pump. However, gases or vapors present in the bottoms recycle stream materially decrease the capacity of the recycle pump. The presence of vapors also reduces the liquid residence time in the reactor and limit hydrogen partial pressure.

Certain reactors employed in the catalytic hydrocracking process with an ebullated-bed of catalyst particles are designed with a central vertical recycle conduit which serves as the downflow conduit, or downcomer, for recycling liquid from the catalyst-free zone above the ebullated catalyst bed to the suction of a recycle pump to re-circulate the liquid through the catalytic reaction zone.

FIG. 1 schematically illustrates a system and apparatus 100 of the prior art in which liquid is recycled internally with a recycle downflow conduit. Apparatus 100 includes an ebullated-bed reactor 160 and an ebullating pump 164. Ebullated-bed reactor 160 includes an inlet 130 for receiving a mixture of hydrogen gas and feedstock and an outlet 166 for discharging product effluent. Ebullating pump 164 is in fluid communication with the ebullated-bed reactor 160 and includes an inlet 162 for receiving effluent recycled from ebullated-bed reactor 160 and an outlet 163 for discharging the recycled effluent at an increased pressure.

In the practice of system 100, a mixture of hydrogen gas and feedstock is introduced into the ebullated-bed reactor 160 via inlet 130 for reaction that includes conversion of the feedstock into lower molecular weight hydrocarbons. Liquid reaction effluent continuously flows down in the downflow conduit located inside ebullated-bed reactor 160, and is recycled back to the ebullated-bed reactor 160 at elevated pressure using ebullating pump 164. Product effluent is recovered via outlet 166.

Alternatively, the recycle liquid can be obtained from a vapor separator located downstream of the reactor or obtained from an atmospheric stripper bottoms stream. The recycling of liquid serves to ebullate and stabilize the catalyst bed, and maintain temperature uniformity through the reactor.

FIG. 2 schematically illustrates a system and apparatus 200 with an external recycle system that includes an ebullated-bed reactor 260, an ebullating pump 264 and a high-pressure separator 280. Ebullated-bed reactor 260 includes an inlet 230 for introducing a mixture of hydrogen gas and feedstock and an outlet 266 for discharging product effluent. High-pressure separator 280 includes an inlet in fluid communication with outlet 266 for receiving product effluent, an outlet 282 for discharging a gas product stream and an outlet 284 for discharging a liquid stream. Ebullating pump 264 includes an inlet 262 in fluid communication with outlet of high-pressure separator for receiving at least a portion of the liquid stream, and an outlet 263 for discharging recycling stream at elevated pressure.

In the practice of system 200, a mixture of hydrogen gas and feedstock is introduced into the ebullated-bed reactor 260 via inlet 230 for reaction which includes the conversion of the feedstock into lower molecular weight hydrocarbons. Reaction effluent is conveyed to the high-pressure separator 280 to obtain a gas stream 282 and a liquid stream 284. At least a portion of the liquid stream 284 is recycled as stream 288 to the ebullated-bed reactor 260 via ebullating pump 264. The remaining portion of the stream 284 can be recovered as product stream 286 or subjected to further refinery processes.

Catalyst bed expansion is an important factor in the ebullated-bed reactor. In the process, the expansion of the bed is controlled by the recycle pump speed. Certain systems include a bed characterized by a number of bed level detectors and one or more additional detectors for determining abnormally high bed (interface) level. The interface level is detected, for instance, by a density detector including a radiation source at an interior point within the reactor and/or a detection source in the reactor wall.

Although ebullated-bed processes are generally used for conversion of heavier vacuum residue feedstocks, they can also be used to clean or treat a lower boiling point vacuum gas oil feedstock. Advantages of ebullated-bed processes include product quality and rate uniformity, reduced downtime and lower capital investment.

The volume and length-to-diameter ratio are known to be factors in ebullated-bed reactor design that impact the catalyst load. For a given volume reactor, the greater the length-to-diameter ratio, the more catalyst that can be introduced into the reactor.

Gas and liquid hold-up rates are important process characteristics that contribute to the system performance. High gas hold-up rates result in decreased liquid residence time which lowers process performance. The gas hold-up rate in an ebullated-bed reactor can be as high as 40%.

Although there are numerous types of ebullated-bed reactor designs, the problems exists of providing a more efficient and effective ebullated-bed reactor process and achieving improved reactor performance that eliminates or minimizes gas hold-up in the recycle system and its adverse effect on the recycle pump.

SUMMARY OF THE INVENTION

The above problems are addressed and further advantages are provided by the system and process for processing feedstocks in an ebullated-bed hydroprocessing reactor in which hydrogen gas is dissolved in the combined fresh and recycled liquid feedstock by mixing and/or diffusion upstream of the reactor inlet, flashing the mixture and recovering undissolved hydrogen and any light components, following which the feed containing dissolved hydrogen is charged to an ebullated-bed hydroprocessing reactor. The problem of gas hold-up that is typical of ebullated-bed reactors of traditional design is minimized.

The invention is thus directed to a process for conversion of a liquid hydrocarbon feedstock into lower molecular weight hydrocarbon compounds in an ebullated-bed reactor, the process comprising:

mixing the fresh and recycled liquid hydrocarbon feedstock and an excess of hydrogen gas in a mixing zone to dissolve a portion of the hydrogen gas in the liquid hydrocarbon feedstock to produce a hydrogen-enriched liquid hydrocarbon feedstock;

conveying the hydrogen-enriched liquid hydrocarbon feedstock and excess hydrogen to a flashing zone in which at least a portion of undissolved hydrogen gas is flashed;

passing the hydrogen-enriched liquid hydrocarbon feedstock from the flashing zone to a feed inlet of the ebullated-bed reactor for reaction including conversion of the feedstock into lower molecular weight hydrocarbons;

recovering the converted lower weight hydrocarbon products from a substantially catalyst-free region of the ebullated-bed reactor; and recycling the unconverted fed for mixing with fresh feedstock for reprocessing.

The process and system of the invention solves the problems related to gas hold-up and those associated with reduced efficiency of the recycle pump due to the presence of gas in the recycle stream that are typically encountered in ebullated-bed hydroprocessing reactors of the prior art.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

In accordance with the process of the invention, a substantial portion of the hydrogen gas required for hydroprocessing/hydrocracking reactions is dissolved in the liquid feedstock. A hydrogen distributor apparatus is utilized to treat the feedstock upstream of the ebullated-bed reactor to dissolve at least a substantial portion of the requisite reaction hydrogen gas into the liquid feedstock to produce a combined feed/hydrogen stream as the ebullated-bed reactor influent.

In the practice of the process of the invention, the ebullated-bed reactor gas hold-up is less than 40 V % of the total liquid volume passing through the reactor, and preferably less than 10 V %, and most preferably less than 1 V % of the liquid volume.

Also in the practice of the process of the invention, the ebullated-bed recycle stream contains less than 10 V % of vapors, preferably less than 1.0 V %, and most preferably less than 0.1 V % of vapors.

Figure 1:
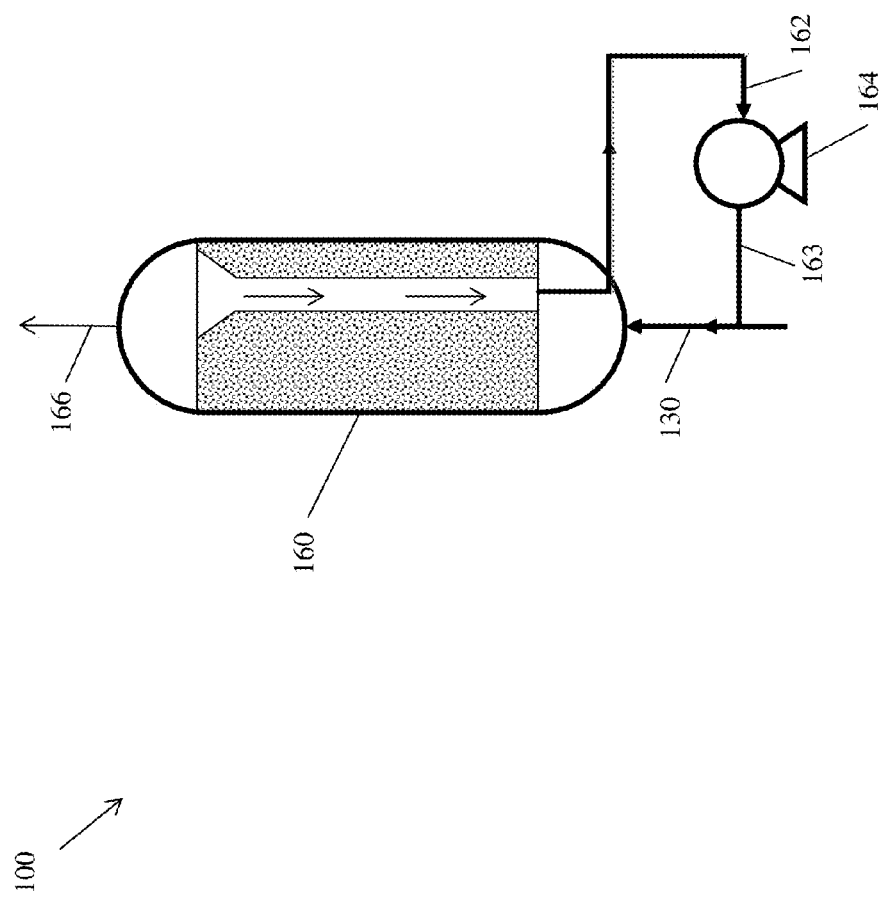
FIG. 1 is a schematic diagram of a conventional ebullated-bed reactor of the prior art with internal recycle.
Figure 2:
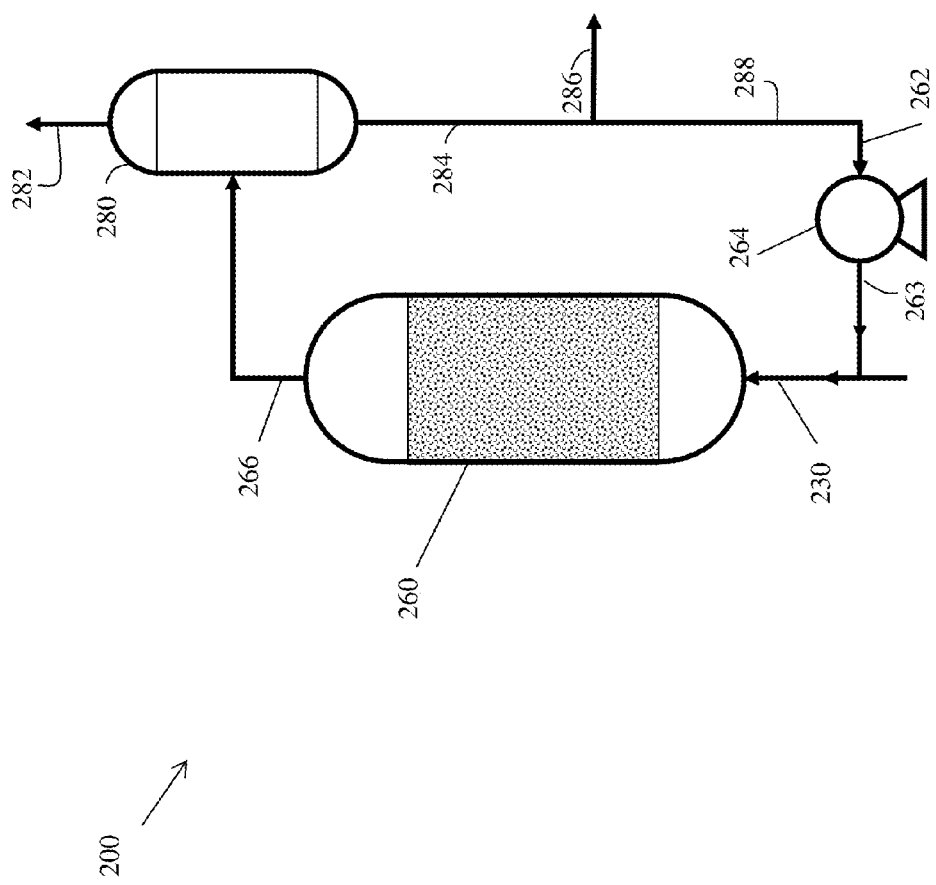
FIG. 2 is a schematic diagram of a conventional ebullated-bed reactor of the prior art with external recycle.
Figure 3A:
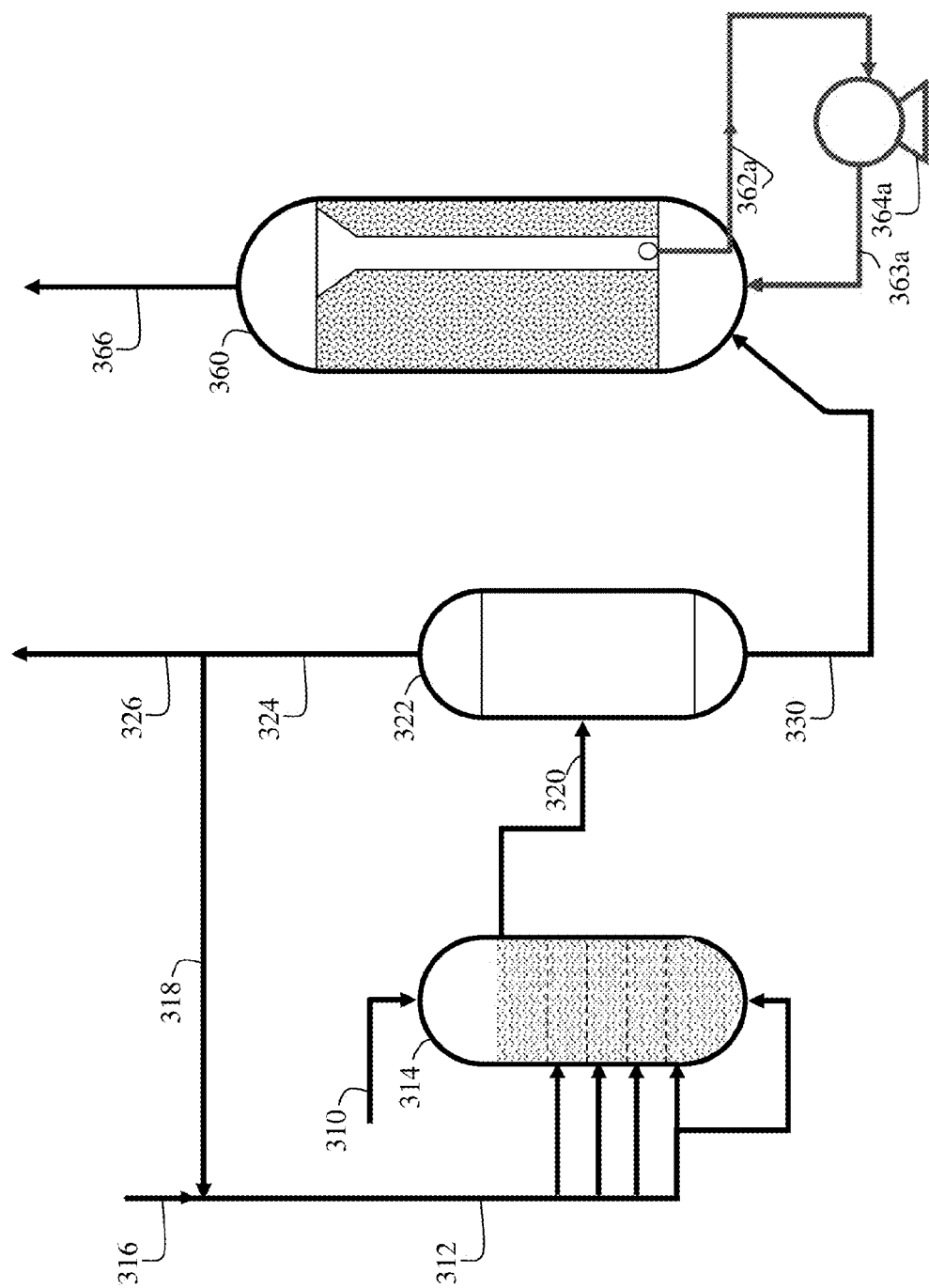
FIGS. 3A-3C are schematic diagrams of ebullated-bed processes with internal recycle and a straight recycle system (FIG. 3A), a combined recycle and feedstock hydrogen addition system (FIG. 3B) and a feedstock hydrogen addition system combined with a recycle separation system (FIG. 3C)
Figure 3B:
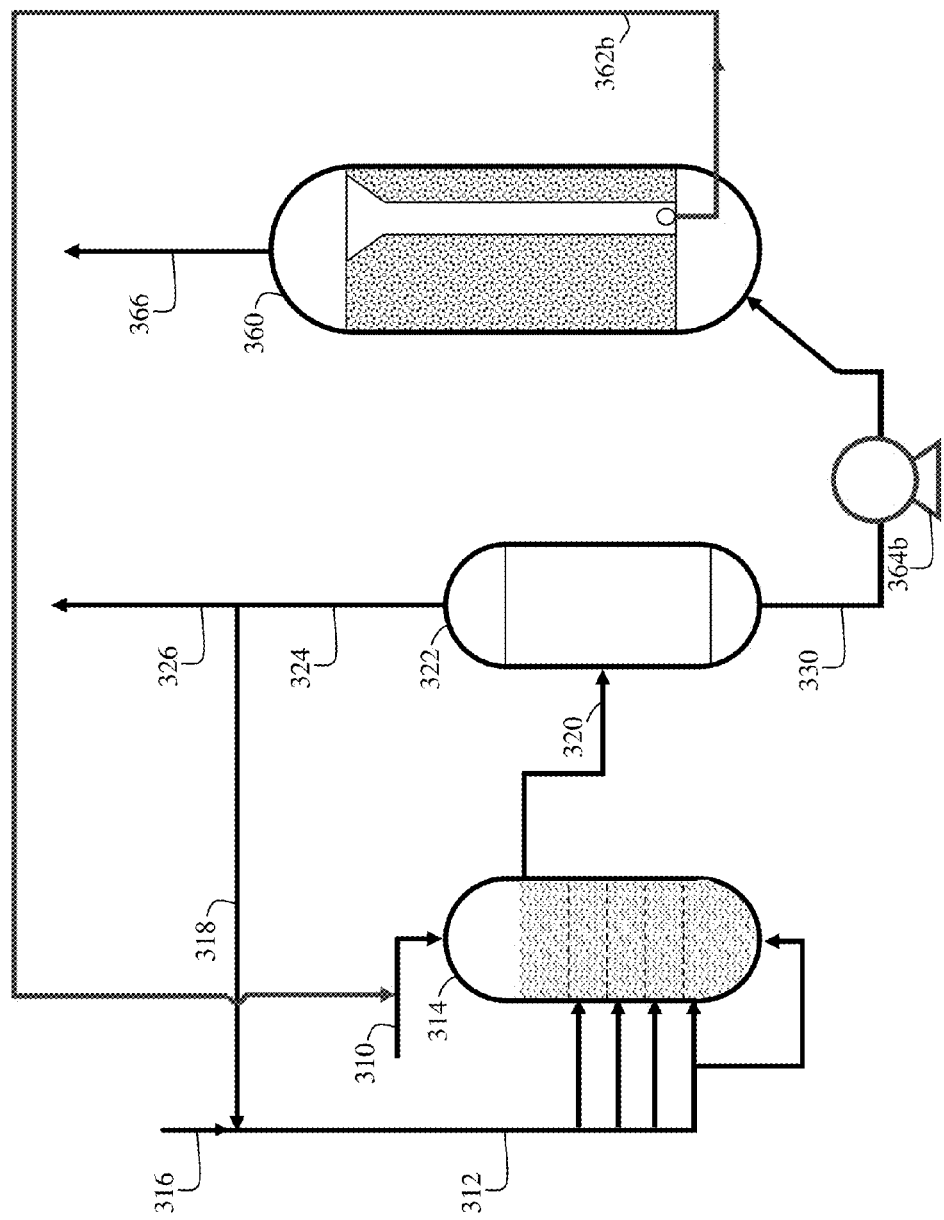
Figure 3C:
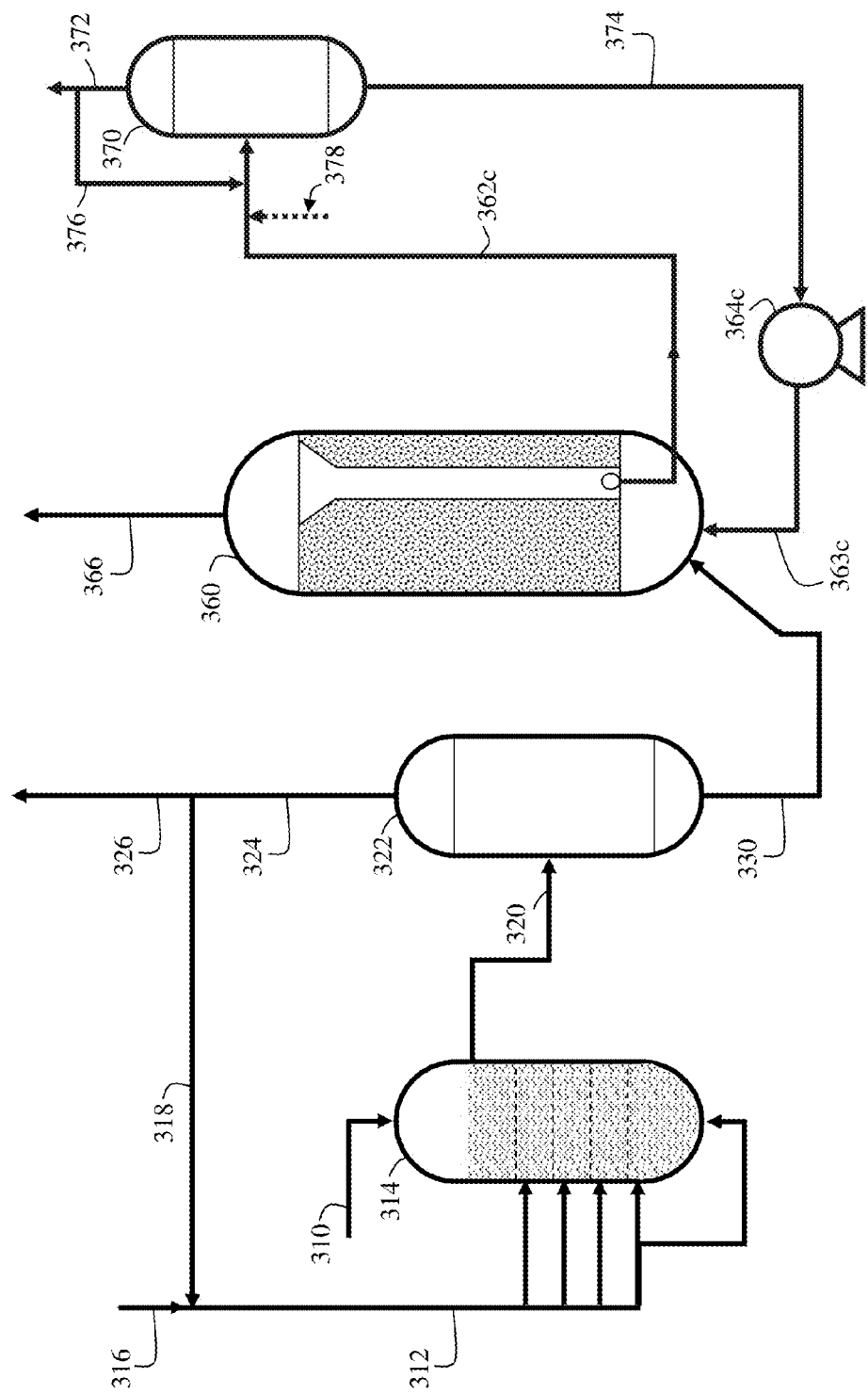

FIGS. 3A-3C depict internal-recycle type ebullated-bed reactor apparatus adapted for receiving a charge 320 including at least a substantial portion of the requisite hydrogen in solution with the feedstock.

The apparatus for the process generally includes a hydrogen distributor 314, a flash vessel 322, an ebullated-bed reactor vessel 360, and one or more pumps 364a, 364b and 364c.

A feedstock stream 310 is mixed with an excess of hydrogen gas 312 in a distributor vessel 314 to dissolve a desired quantity of hydrogen in the liquid and produce a hydrogen-enriched liquid hydrocarbon feedstock. The hydrogen gas stream 312 includes fresh hydrogen 316 and recycled hydrogen 318.

In certain embodiments, a column is used as a hydrogen distributor vessel in which hydrogen gas is injected at one or more locations, at least one of which is toward the bottom of the column. The liquid feedstock can be fed from the bottom or top of the column. Hydrogen gas is injected through hydrogen distributors into the column for intimate mixing to promote saturation of the feedstock with dissolved hydrogen.

Combined stream 320, which includes hydrogen-enriched feedstock and excess hydrogen gas, is conveyed to the flashing zone 322 in which excess hydrogen and other gases (e.g., light feedstock fractions) are flashed off as stream 324. A portion of stream 324 is recycled as stream 318 with the fresh hydrogen feed 316. The remaining portion of the flashed gases is discharged from the system as a bleed stream 326, which can be distributed or collected for other refinery and/or petrochemical applications (not shown).

The hydrogen-enriched hydrocarbon feedstock stream 330 which contains the dissolved hydrogen is fed to an ebullated-bed reactor 360 for hydroprocessing reactions. The reactor effluents product stream 366 is discharged from the ebullated-bed reactor and fed into one or more separation vessels (not shown) for product recovery.

Alternatively, the product stream 366 can be conveyed to one or more downstream ebullated-bed reactor systems, which can include one or more of the associated unit operations described herein, e.g., upstream flashing vessel, downstream flashing vessel, and/or one or more additional hydrogen distributor apparatus.

The embodiments of FIGS. 3A, 3B and 3C can be implemented individually or in various combinations with the feedstock hydrogen addition system. An ebullated-bed process with a straight recycle system is depicted in FIG. 3A. An ebullated-bed process with a combined recycle and feedstock hydrogen addition system is depicted in FIG. 3B. An ebullated-bed process with a feedstock hydrogen addition system combined with a recycle separation system is depicted in FIG. 3C.

In particular, referring to FIG. 3A, hydrogen-enriched hydrocarbon feedstock 330 from flashing vessel 322 is charged to the ebullated-bed reactor 360. In the internal-recycle type ebullated-bed reactor, liquid recycle effluent 362a is drawn through the downcomer conduit in fluid communication with the catalyst-free zone above the catalyst bed by draw force of an ebullated pump 364a. The recycle stream 363a from ebullated pump 364a is returned to the catalyst bed, with the fluid pressure causing catalyst bed expansion.

Referring to FIG. 3B, internal recycle effluent 362b is passed to hydrogen gas distributor 314 and combined with the feedstock stream 310 for hydrogen saturation. The combined hydrogen-saturated stream 330 is conveyed to the ebullated-bed reactor with the fluid pressure imparted by ebullating-bed pump 364b causing bed expansion of the catalyst.

Referring to FIG. 3C, hydrogen-enriched hydrocarbon feedstock 330 from flashing vessel 322 is charged to the ebullated-bed reactor 360. Internal recycle effluent 362c is passed through a separator vessel 370 with optional hydrogen incorporation via stream 378. Separator bottoms 374 are passed through an ebullating pump 364c and a recycle stream 363c is returned to ebullated-bed reactor 360. The fluid pressure imparted to recycle stream 363c by ebullating pump 364c causes catalyst bed expansion. A portion of separator tops 372 including recycle hydrogen and light gases is bled from the system, and a portion 376 is recycled and mixed with recycle effluent 362c along with optional make-up hydrogen via stream 378.

Figure 4A:
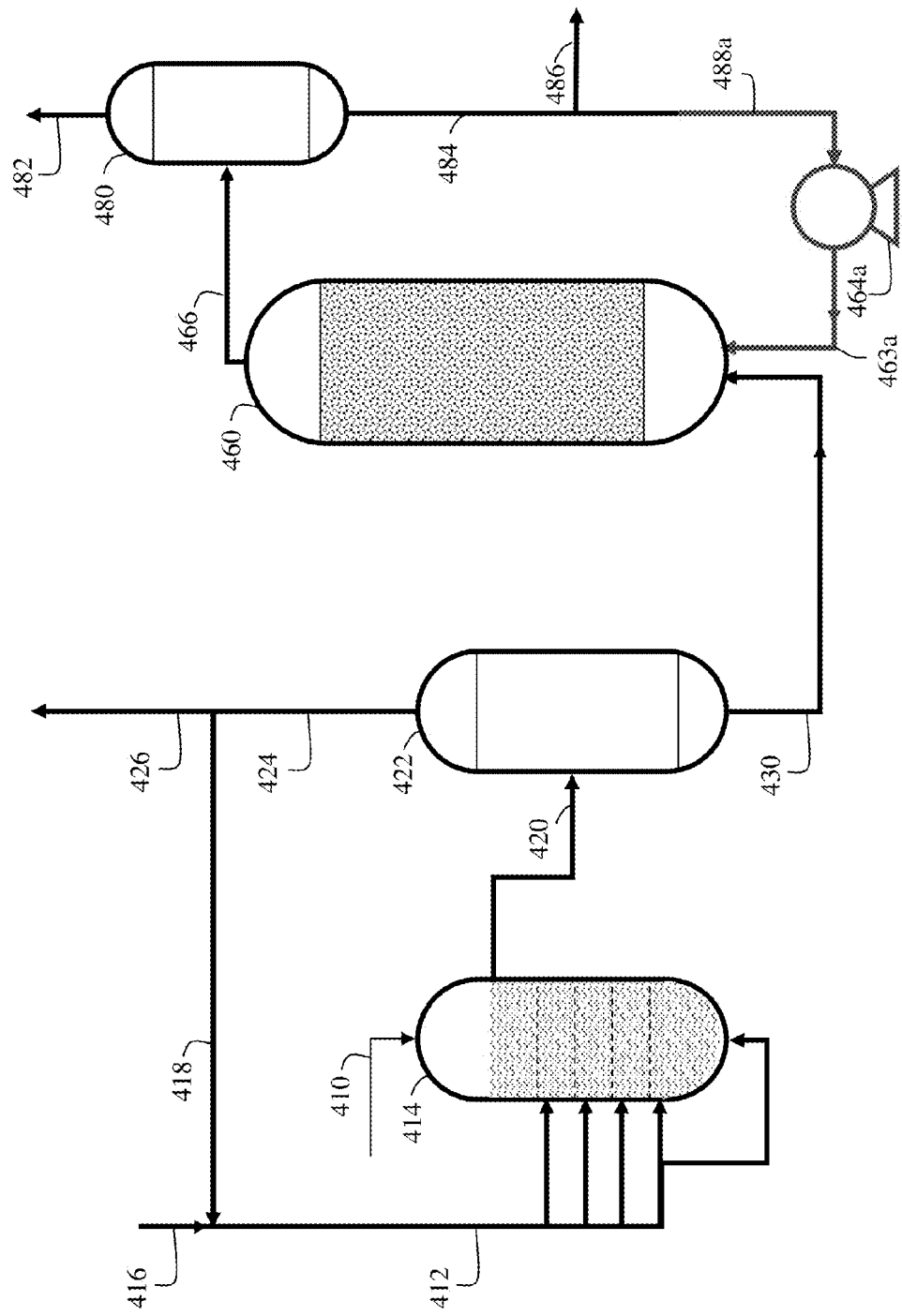
FIGS. 4A-4C are schematic diagrams of ebullated-bed processes with external recycle and a straight recycle system (FIG. 4A), a combined recycle and feedstock hydrogen addition system (FIG. 4B) and a feedstock hydrogen addition system combined with a recycle separation system (FIG. 4C).
Figure 4B:
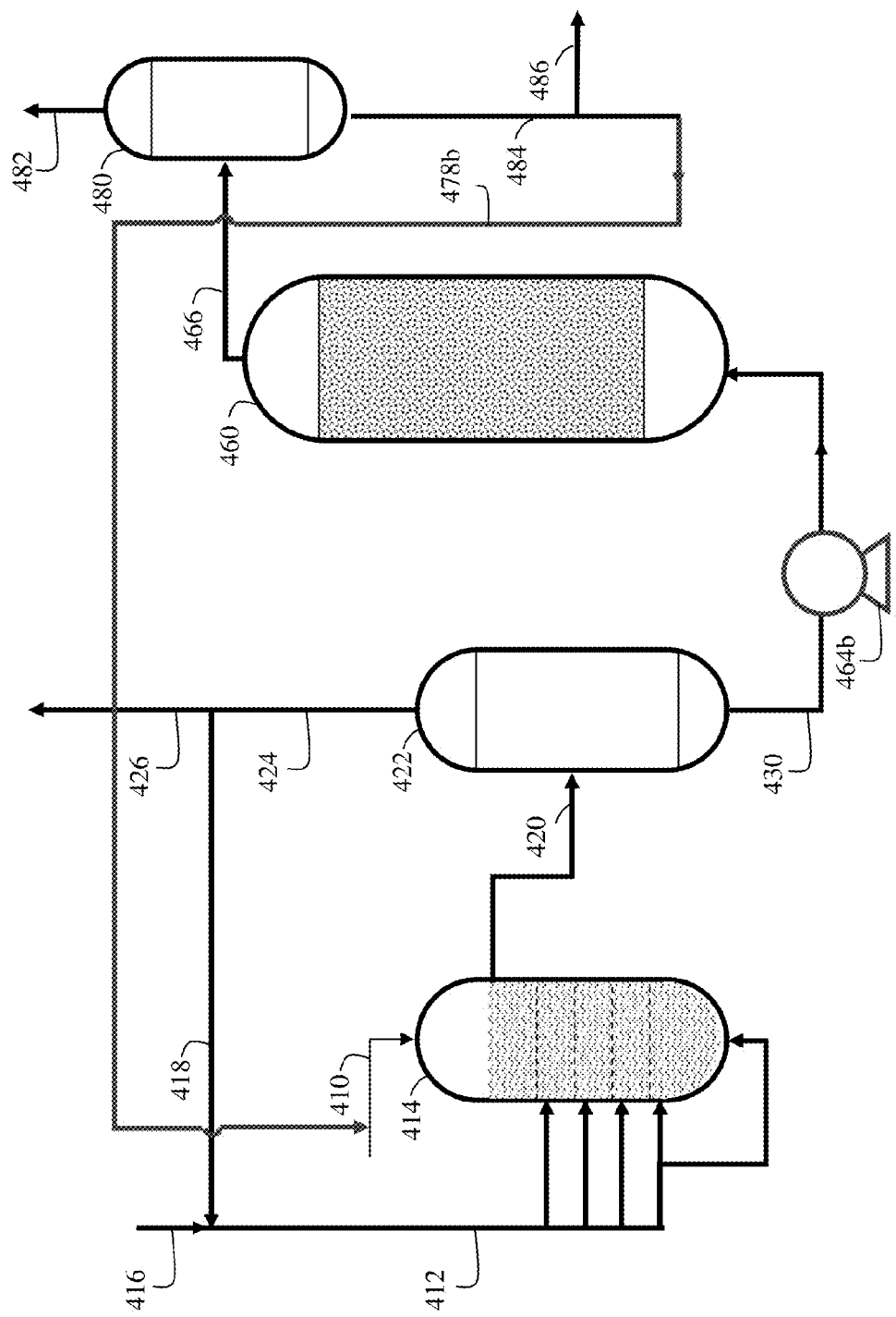
Figure 4C:
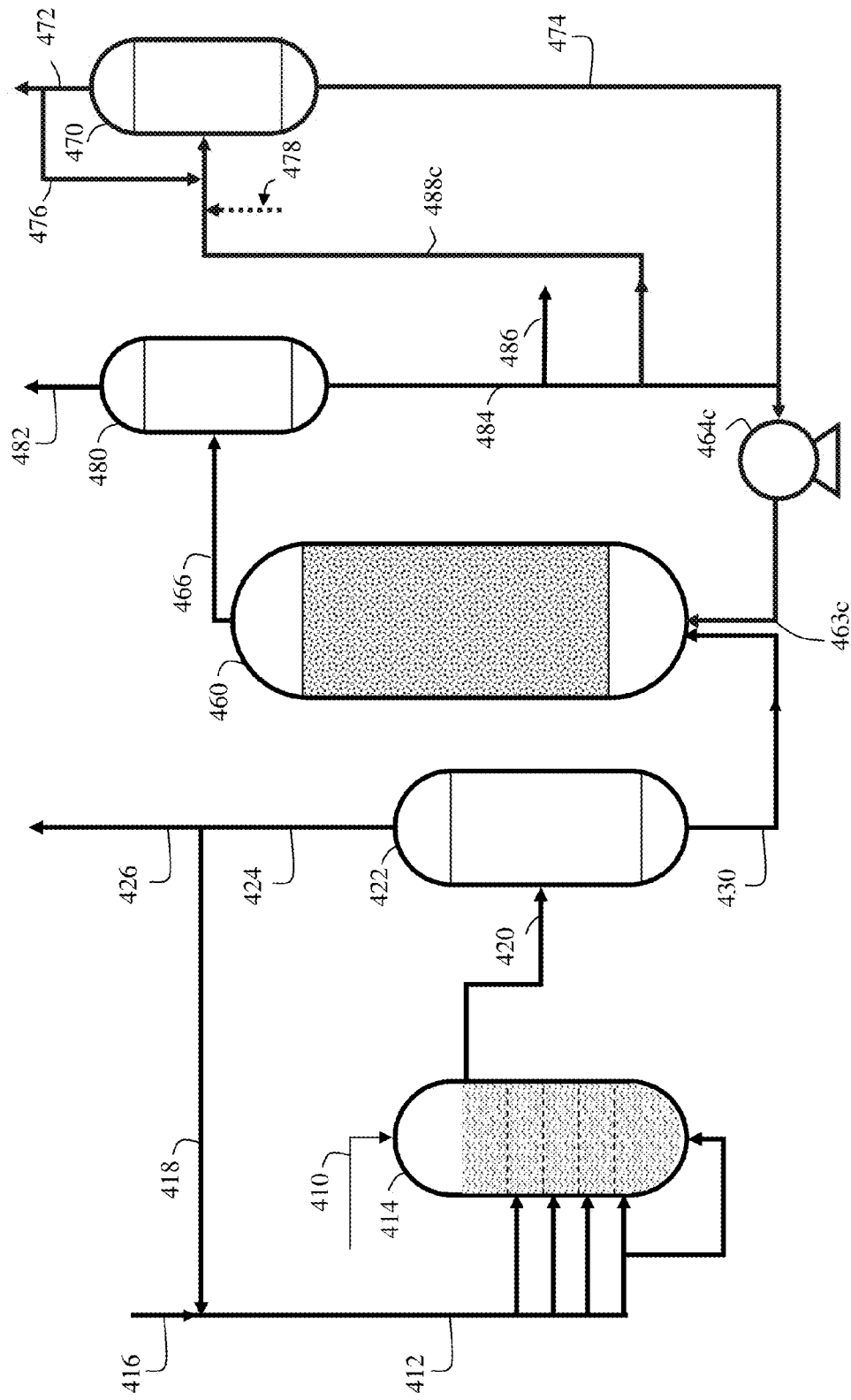

In another embodiment depicted in FIGS. 4A-4C, external-recycle type ebullated-bed reactors are adapted to receive a charge 420 including at least a substantial portion of the requisite hydrogen in solution with the feedstock.

The apparatus for the process generally includes a hydrogen distributor 414, a flash vessel 422, an ebullated-bed reactor vessel 460, a recycle separation vessel 480, and one or more ebullating pumps 464a, 464b and 464c.

A feedstock stream 410 is mixed with hydrogen gas 412 in a distributor vessel 414 to dissolve a suitable quantity of hydrogen in liquid mixture and produce a hydrogen-enriched liquid hydrocarbon feedstock. The hydrogen gas stream 412 includes fresh hydrogen 416 and recycled hydrogen 418.

In certain embodiments, a column is used as a hydrogen distributor vessel, in which hydrogen gas is injected at one or more locations, at least one of which toward the bottom of the column. The liquid feedstock can be fed from the bottom or top of the column. Hydrogen gas is injected through hydrogen distributors into the column for adequate mixing to promote formation of a feedstock containing dissolved hydrogen.

Combined stream 420, which includes hydrogen-enriched feedstock and excess hydrogen gas, is conveyed to the flashing zone 422 in which excess hydrogen and other gases, e.g., light feedstock fractions, are flashed off as stream 424. A portion of stream 424 is recycled as stream 418 with the fresh hydrogen feed 416. The remaining portion of the flashed gases is discharged from the system as a bleed stream 426, which can be distributed or collected for other refinery and/or petrochemical applications (not shown).

The hydrogen-enriched hydrocarbon feedstock stream 430 which contains a suitable quantity of dissolved hydrogen is fed to the ebullated-bed reactor 460 for hydroprocessing reactions.

The ebullated-bed reactor effluents product stream 466 is sent to a recycle separation vessel 480 to flash-off the gas products stream 482 and recover a liquid products stream 484, a portion of which is recycled. A portion 486 of the liquid products stream is drawn-off from the process and passed to one or more separation vessels (not shown) for product recovery. Alternatively, the product stream 486 can be conveyed to one or more downstream ebullated-bed reactor systems, which can include one or more of the associated unit operations shown herein, e.g., upstream flashing vessel, downstream flashing vessel, and/or one or more additional hydrogen distributor apparatus.

The various embodiments of FIGS. 4A, 4B and 4C can be implemented individually or in various combinations with the feedstock hydrogen addition system. An ebullated-bed process with a straight recycle system is depicted in FIG. 4A. An ebullated-bed process with a combined recycle and feedstock hydrogen addition system is depicted in FIG. 4B. An ebullated-bed process with a feedstock hydrogen addition system combined with a recycle separation system is depicted in FIG. 4C.

In particular, referring to FIG. 4A, hydrogen-enriched hydrocarbon feedstock 430 from flashing vessel 422 is charged to the ebullated-bed reactor 460. In the external-recycle type ebullated-bed reactor, the effluent stream 466 is separated into a product fraction 482 and a liquid fraction 484 in the recycle separation vessel 480. A portion 488a of the liquid products stream 484 serves as the external recycle stream 463a that is charged to the bottom of reactor vessel 460 through an ebullating pump 464a, with the fluid pressure causing catalyst bed expansion.

Referring to FIG. 4B, hydrogen-enriched hydrocarbon feedstock 430 from flashing vessel 422 is charged to the ebullated-bed reactor 460. External recycle effluent 478b is passed to hydrogen gas distributor 414 and combined with the feedstock stream 410 for hydrogen saturation. The combined hydrogen-saturated stream 430 is conveyed to the ebullated-bed reactor with the fluid pressure imparted by ebullating pump 464b causing catalyst bed expansion.

Referring to FIG. 4C, hydrogen-enriched hydrocarbon feedstock 430 from flashing vessel 422 is charged to the ebullated-bed reactor 460. External recycle effluent 488c is passed through a separator vessel 470 with optional hydrogen incorporation via stream 478. Separator bottoms 474 are passed through an ebullating pump 464c and a recycle stream 463c is returned to ebullated-bed reactor 460. The fluid pressure imparted to recycle stream 463c by ebullating pump 464c causes catalyst bed expansion. A portion of separator tops 472 including recycle hydrogen and light gases is bled from the system, and a portion 476 is recycled and mixed with recycle effluent 488c along with optional make-up hydrogen via stream 478.

In general, the operating conditions for the ebullated-bed reactor include a temperature in the range of from 350° C. to 500° C., in certain embodiments from 400° C. to 450° C.; a pressure in the range of from 50 to 300 Kg/cm$^2$, in certain embodiments from 100 to 250 Kg/cm$^2$, and in further embodiments from 150 to 200 Kg/cm$^2$; and a recycle-to-feedstock ratio in the range of from 1:1 to 40:1, in certain embodiments from 1:1 to 20:1.

For the saturation of the feedstock, a hydrogen feed rate of up to about 10,000 standard cubic feet per barrel (SCFB) of feed, in certain embodiments from 500 to 10,000 SCFB, and in further embodiments from 1,500 to 5,000 SCFB is used, the rate being determined by the nature and characteristics of the feedstock.

According to the process and system of the invention, by using a hydrogen-enriched hydrocarbon feedstock which contains at least a substantial portion of the requisite hydrogen for hydroprocessing reactions (in certain embodiments a substantially single-phase combined feed and hydrogen stream) as the feed through the ebullated catalyst bed reactor, problems associated with ebullated pump apparatus related to excess gas in the recycle are alleviated.

Operation of the ebullated-bed reactor is optimized as at least a substantial portion of the hydrogen necessary for hydroprocessing reactions is dissolved in the liquid phase with the feedstream. In certain embodiments, a substantially two-phase system of catalyst and liquid is provided to minimize the reactor volume requirements, increase catalyst loading and liquid volume, and reduce the gas hold-up rate.

Since excess hydrogen gas in the system is minimized or substantially eliminated, the recycle stream and therefore the recycle liquid will have a reduced gas phase compared to conventional ebullated-bed hydroprocessing systems, thereby increasing the efficiency of ebullated-bed recycle pump and minimizing the need for ebullating pumps designed to handle a substantial gas phase. Further, the reduced levels of excess hydrogen will minimize the likelihood of gas hold-up, and reactor volume can be used more effectively, e.g., in certain embodiments an effective reactor volume increase of up to about 40%.

One feature of ebullated-bed reactors is that catalyst addition/withdrawal occurs on a regular basis, and in certain operations, on a continuous or semi-continuous basis without interrupting the reactor's operation. Any catalyst deactivation caused by a possible lack of hydrogen as compared to conventional systems without incorporation of hydrogen in solution with the liquid feedstock is at least partially offset by the regular partial replacement of catalyst. The ebullated-bed reactor cycle length is therefore set by the refiner's inspection and turnaround schedule, not by catalyst activity.

The ebullated-bed reactors operate at constant temperature, whereas the fixed-bed reactors operate over wide a temperature range. Pressure drop is relatively low in the ebullated-bed reactor as a result of ebullation.

Back-mixing characteristics of the ebullated-bed reactor process provides enhanced reactant dispersing and results in a near-isothermal bed conditions. Reaction temperature is controlled by the temperature of the feed, which results in isothermal temperature operation across the reactor. This eliminates the requirement for a hydrogen gas quench in the reactor. Isothermal operation (no quench requirement) in the ebullated-bed process will increase the feedstock processing flexibility, and relatively heavier feedstock can be process in the ebullated-bed reactors according to the present system and process.

Example

A vacuum residue derived from Arabian heavy crude oil, the characteristics of which are given in Table 1, was hydrocracked in a single-stage ebullated-bed reactor at 440° C., 150 bars of hydrogen partial pressure, 0.3 liters of oil per liters of reactor volume and with 0.8 kg of catalyst per tons of vacuum residue. The total hydrogen gas rate is set at four times the rate at which hydrogen is consumed in the process. The ebullated-bed reactor was operated at a recycle-to-feedstock ratio of 10:1.

TABLE 1

| Property | Unit | Composition Value |
|---|---|---|
| Density | Kg/L | 1.04 |
| Sulfur | W % | 5.3 |
| Nitrogen | ppmw | 4000 |
| CCR | W % | 25 |
| 1050° C.+ | W % | 91 |

The total material balance for the process which is configured as shown in FIG. 3B is given in Table 2.

TABLE 2

| Component | Stream | | | | | | | | | |
|---|---|---|---|---|---|---|---|---|---|---|
| | 310 | 316 | 312 | 320 | 324 | 326 | 318 | 330 | 366 | 362b |
| Hydrogen | | 93 | 381 | 381 | 288 | 0 | 288 | 93 | | |
| $H_2S$ | | | | | | | | | 510 | |
| $NH_3$ | | | | | | | | | 30 | |
| $CH_4$ | | | | | | | | | 85 | |
| $C_2H_6$ | | | | | | | | | 86 | |
| $C_3H_8$ | | | | | | | | | 150 | |
| $C_4H_{10}$ | | | | | | | | | 120 | |
| $C_5$-180 | | | | | | | | | 810 | |
| 180° C.-240° C. | | | | | | | | | 537 | |
| 240° C.-370° C. | | | | | | | | | 1,634 | |
| 370° C.-520° C. | 900 | | | 900 | | | | 900 | 2,340 | |
| 520° C.+ | 9,100 | | | 48,000 | | | | 48,000 | | 38,900 |
| Total | 10,000 | 93 | 381 | 49,281 | 288 | 0 | 288 | 48,993 | 6,302 | 38,900 |

The total conversion of the hydrocarbons boiling above 520° C. was 61 W % and 92 W % of hydrodesulfurization was achieved in the process. Since hydrogen was dissolved in the feedstock, the gas phase hydrogen was eliminated in the ebullated-bed reactor which resulted in a savings of 30-40 V % of the reactor space that was previously required for gas hold-up in the three phase system of the prior art.

The method and system of the present invention have been described above and in the attached drawings; however, modifications will be apparent to those of ordinary skill in the art and the scope of protection for the invention is to be defined by the claims that follow.

The invention claimed is:

1. A process for the conversion of a liquid hydrocarbon feedstock into lower molecular weight hydrocarbon compounds in an ebullated-bed catalytic hydroprocessing reactor, the reactor including an internal recycle downflow conduit in find communication with a substantially catalyst-free region above the ebullated catalyst bed for transferring unreacted or partially reacted hydrocarbons heavier than a recovered converted hydrocarbon product to the bottom of the reactor, the process comprising:

mixing the liquid hydrocarbon feedstock with an excess of hydrogen gas in a mixing zone to dissolve a portion of the hydrogen gas in the liquid hydrocarbon feedstock to produce a hydrogen-enriched liquid hydrocarbon feedstock;

conveying the hydrogen-enriched liquid hydrocarbon feedstock and undissolved hydrogen to a flashing zone in which at least a portion of undissolved hydrogen gas is flashed;

passing the hydrogen-enriched liquid hydrocarbon feedstock from the flashing zone to a feed inlet of the ebullated-bed reactor for reaction that includes conversion of the feedstock into lower molecular weight hydrocarbons; and recovering converted hydrocarbon products of lower molecular weight from a substantially catalyst-free region of the ebullated-bed reactor;

passing untreated or partially reacted hydrocarbons from the internal recycle downflow conduit at the bottom of the ebutlated-bed reactor to an external recycle separation zone which includes an external separation unit or flash unit inlet in fluid communication with the internal recycle downflow conduit and an outlet in fluid communication with a recycle ebullating pump for passing the separation unit or flash unit bottoms to the inlet of the ebullated-bed reactor;

passing the external separation unit or flash unit bottoms from which hydrogen and light gases have been removed to the recycle ebullating pump; and passing the separation unit or flash unit bottoms from the recycle ebutlating pump to an inlet of the ebullated-bed reactor.

2. The process of claim 1, wherein the ebullated-bed reactor gas hold-up is in the range of from less than 40 V % to 10 V % of the total liquid volume.

3. The process of claim 1, wherein the ebullated-bed reactor gas hold-up is less than 1 V %.

4. The process of claim 1, wherein the ebullated-bed recycle stream contains a volume of vapors that is in the range of from less than 10 V % to less than 1 V % of the total liquid volume.

5. The process of claim 1, wherein the ebullated-bed recycle stream contains a volume of vapors that is less than 0.1 V % of the total liquid volume.

6. The process of claim 1, wherein the ebullated-bed reactor is operated at a temperature in the range of from 350° C. to 500° C.

7. The process of claim 1, wherein the ebullated-bed reactor is operated at a temperature in the range of from 400° C. to 450° C.

8. The process of claim 1, wherein the ebullated-bed reactor is operated at a pressure in the range of from 50 to 300 $Kg/cm^2$.

9. The process of claim 1, wherein the ebullated-bed reactor is operated at a pressure in the range of from 100 to 250 $Kg/cm^2$.

10. The process of claim 1, wherein the ebullated-bed reactor is operated at a pressure in the range of from 150 to 200 $Kg/cm^2$.

11. The process of claim 1, wherein the hydrogen and feedstock mixing and saturation zone is operated at a hydrogen feed rate in the range of from 500 to 10,000 standard cubic feet per barrel (SCFB) of feedstock.

12. The process of claim 1, wherein the hydrogen and feedstock mixing and saturation zone is operated at a hydrogen feed rate in the range of from 1500 to 5,000 SCFB.

13. The process of claim 1, wherein a portion of a tops stream containing light gases and hydrogen is recovered from the external recycle separation zone and recycled to the external separation unit or flash inlet.

14. The process of claim 1, wherein hydrogen is incorporated into the hydrocarbons from the bottom of the ebullated-bed reactor upstream of the external recycle separation zone.

* * * * *